United States Patent [19]

Baba

[11] Patent Number: 4,819,333
[45] Date of Patent: Apr. 11, 1989

[54] CUTTER HEAD FOR GRASS TRIMMER
[75] Inventor: Toru Baba, Yokosuka, Japan
[73] Assignee: Kioritz Corporation, Tokyo, Japan
[21] Appl. No.: 165,089
[22] Filed: Mar. 7, 1988
[30] Foreign Application Priority Data Mar. 10, 1987 [JP] Japan .............................. 62-34648[U]

[51] Int. Cl.⁴ ............................................... A01G 3/06
[52] U.S. Cl. ................................................ 30/276; 30/347
[58] Field of Search .................. 30/276, 347; 56/12.7, 56/295

[56] References Cited

U.S. PATENT DOCUMENTS

| | | | |
|---|---|---|---|
| 4,043,103 | 8/1977 | Lakin et al. | 30/276 X |
| 4,054,993 | 10/1977 | Kamp et al. | 30/276 |
| 4,068,377 | 1/1978 | Kimmel et al. | 30/276 |
| 4,097,991 | 7/1978 | Proulx | 30/276 |
| 4,124,938 | 11/1978 | Ballas, Sr. | 30/276 |
| 4,131,045 | 12/1978 | Peterson | 30/276 X |
| 4,268,964 | 5/1981 | Moore | 30/276 |
| 4,335,510 | 6/1982 | Close et al. | 30/276 |
| 4,656,739 | 4/1987 | Pittinger | 30/276 |

Primary Examiner—Douglas D. Watts
Attorney, Agent, or Firm—Browdy and Neimark

[57] ABSTRACT

A cutter head for a grass trimmer is disclosed which has a hole formed in a disc portion for guiding a distal end of a cord from a cord winding portion toward a boss portion and an annular flange portion formed integrally with a circumferential portion of a disc portion on the side of the boss portion. The annular flange portion has a hole through which the distal end of the cord is fed radially outwardly of the disc portion.

3 Claims, 3 Drawing Sheets

CUTTER HEAD FOR GRASS TRIMMER

BACKGROUND OF THE INVENTION

The present invention relates to a cutter head for a grass trimmer which is mounted at a distal end portion of a rotary drive shaft with a cord being made of synthetic resin such as nylon and being radially outwardly fed therefrom. The cord is rotated at a high speed to cut grass or weed as a cutter.

In some conventional cutter heads of this type, there is provided a complicated mechanism for automatically feeding the cord from the head when the cord used as a cutter is damaged or consumed. However, in a most popular manual feed cutter, it is necessary to manually loosen a fastening nut provided at a bottom surface of the head, to manually withdraw the cord wound within the head and to again manually fasten the nut. This needs considerably troublesome manual works.

SUMMARY OF THE INVENTION

Accordingly, an object of the present invention is to provide a cutter heat for a grass cutter from which a cord may readily be fed and in which the number of mechanical parts or components is reduced for simplification of the structure.

In order to attain this and other objects, according to the present invention, there is provided a cutter head comprising: a boss portion adapted to be mounted on a rotary drive shaft of a grass trimmer; a disc portion formed coaxially and integrally with the boss portion; a cord winding portion around which a cutter cord is to be wound, said cord winding portion extending in an axial direction of the disc portion and being formed integrally with the disc portion in an opposite side to the boss portion; a flange portion formed integrally with an axially outward end of the cord winding portion; a hole means formed in the disc portion for guiding a distal end of the cord from the cord winding portion toward the boss portion; and an annular flange portion formed integrally with a circumferential portion of the disc portion on the side of the boss portion, and said annular flange portion having a hole through which the distal end of the cord is fed radially outwardly of the disc portion.

With such a cutter head having a simple and integral structure, it is possible to readily perform the cord feeding/winding operation.

Thus, according to the present invention, the structure of the cutter head is simplified and made compact in size and light in weight. The cutter head may be integrally formed of synthetic resin or lightweight metal. In addition, the cord feeding/winding operation may readily be performed.

DESCRIPTION OF THE PREFERRED EMBODIMENTS

Embodiments of the present invention will now be described with reference to the accompanying drawings.

Figure 1:
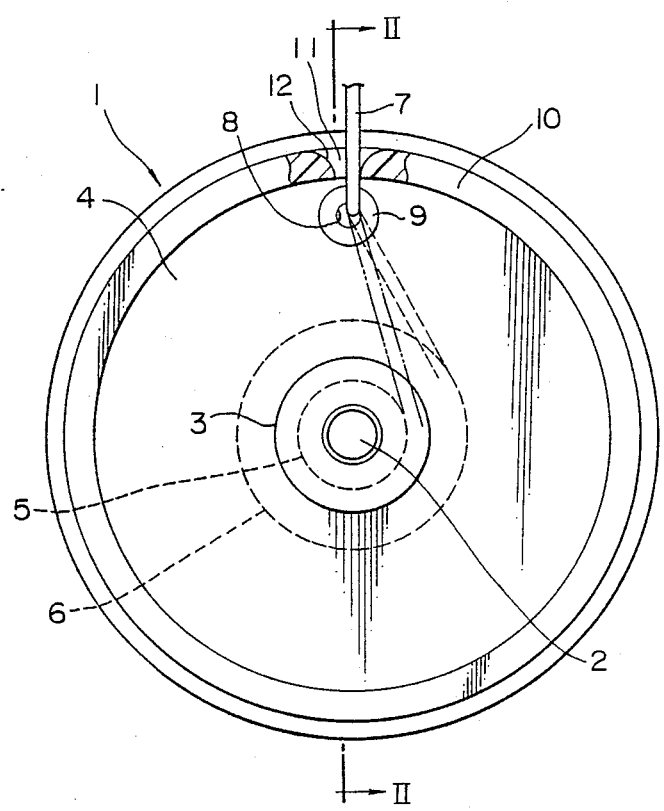
FIG. 1 is a partially fragmentary plan view showing a cutter head in according with one embodiment of the invention.
Figure 2:
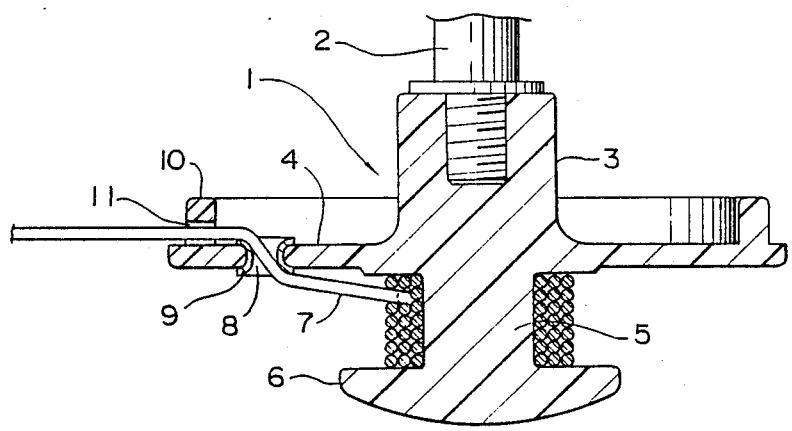
FIG. 2 is a cross-sectional view taken along the line II—II of FIG. 1.

In FIGS. 1 and 2, a cutter head 1 according to one embodiment of the invention has a boss portion 3 threadedly fixed to a distal end of a rotary drive shaft 2 in an end portion of an operation rod of a grass trimmer (not shown). The boss portion 3 is arranged coaxially with the drive shaft 2 and extends in the axial direction. A disc portion 4 expanding in a lateral direction coaxially with the boss portion 3 is formed integrally with a lower portion of the boss portion 3. Also, in the cutter head 1, a cord winding portion 5 in the form of a suitable shape such as an oblong form with a relatively small outside diameter is formed in the axial direction from the disc portion 4 in the opposite direction to the boss portion 3 with respect to the disc portion 4. The cord winding portion 5 is coaxial and integral with the disc portion 4. A flange portion 6 having a larger outside diameter than that of the cord winding portion 5 is formed integrally and coaxially with the cord winding portion 5 at an axially outward end of the cord winding portion 5.

A cutter cord 7 made of synthetic resin such as nylon is used as a cutter and is wound around the cord winding potion 5 having a suitable length. An inner distal end of the cord 7 is fixed to the cord winding portion 5. The cord 7 wound around the cord winding portion 5 is retained on the cord winding portion 5 by the flange portion 6.

An axial hole 8 is formed at a part of the disc portion 4 adjacent to a circumferential portion thereof. The outward end portion of the cord 7 wound around the cord winding portion 5 is inserted into the hole 8 from below. The axial hole 8 is formed so that the cord 7 may readily be inserted therethrough, and is provided with a bush member 9 at an inner surface of the hole 8 for preventing the cord 7 from being damaged. Furthermore, an annular flange portion 10 extending in the axial direction is formed integrally with a surface of the circumferential portion of the disc portion 4 on the side of the boss portion 3. A radial hole 11 is formed in the vicinity of the axial hole 8 in the annular flange portion 10. The radial hole 11 has an inside diameter somewhat larger than a diameter of the cord 7 and a curved portion 12 rounded and opened toward the outside. The outward end portion of the cord 7 inserted into the axial hole 8 extends radially outwardly of the disc portion 4 through the radial hole 11. The cord 7 is prevented from being wound back accidentally by the bending resistance due to the fact that the cord 7 is bent during passing through the axial hole 8 and the radial hole 11.

When the cutter head 1 is rotatingly driven by the rotary drive shaft 2, the outward end portion of the cord 7 fed from the disc portion 4 to the outside is rotated and kept tight by the centrifugal force, so that the outward end portion of the cord 7 is used as a cutter to cut the grass or the like. When the outward portion of the cord 7 is consumed or damaged during the operation, the rotary drive shaft 2 and the cutter head 1 are halted, the cord 7 wound around the cord winding portion 5 is loosened by a suitable length, the loosened cord 7 is removed over the flanged portion 6 and then the outward end portion of the cord 7 is withdrawn toward the outside to thereby provide a new outward end portion of the cord 7.

Figure 3:
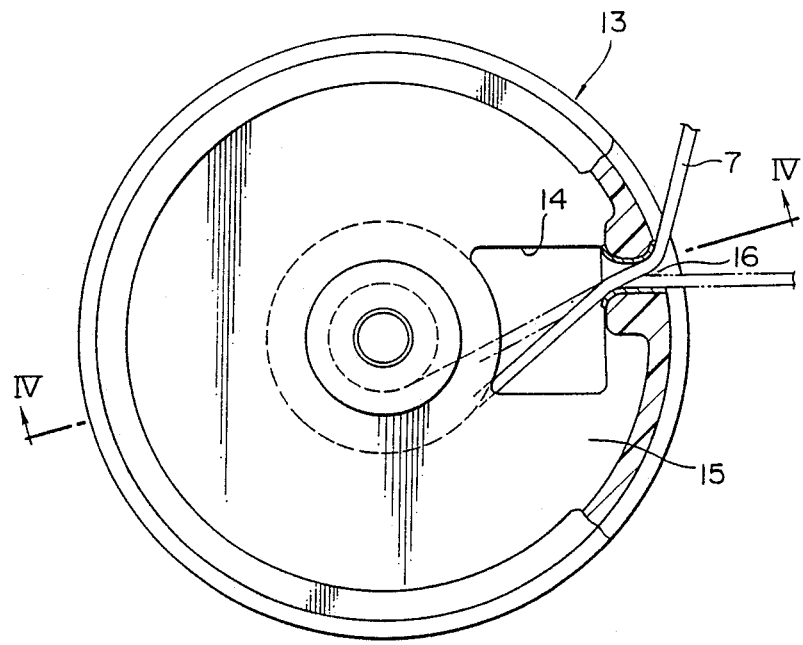
FIG. 3 is a partially fragmentary plan view showing a cutter head in accordance with another embodiment of the invention.
Figure 4:
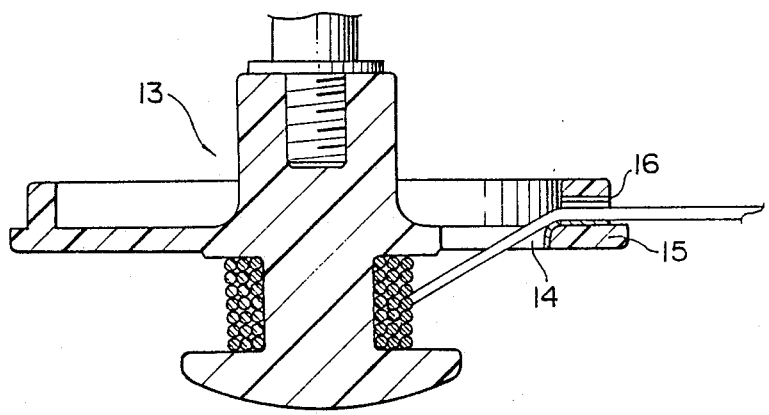
FIG. 4 is a cross-sectional view taken along the line IV—IV of FIG. 3.

In accordance with another embodiment of the invention shown in FIGS. 3 and 4, an axial hole 14 having an opening area greater than that of the axial hole 8 in the foregoing embodiment is formed in a disc portion 15. In addition to the cord insertion function, the hole 14 serves as a cutaway hole needed for obtaining a weight balance for a revolving body inclusive of the cutter head 13 and the outward end portion of the cord 7 fed outward from the radial hole 16 formed in the annular flange portion. Also, the size of the hole 14 is large in size, so that it is possible to readily perform the feeding operation of the cord by inserting the operator's finger.

Figure 5:
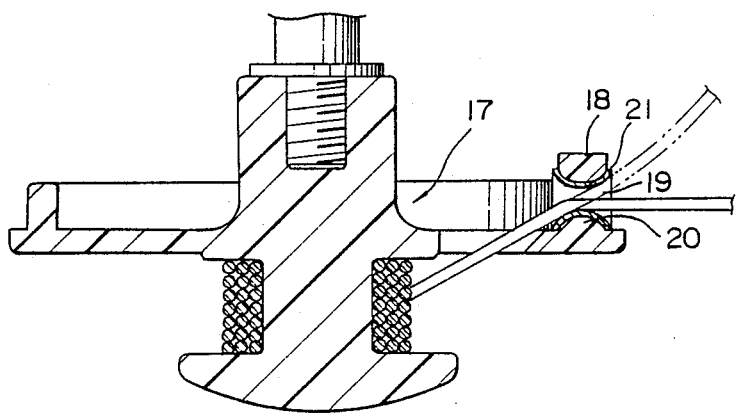
FIG. 5 is a sectional view showing a cutter head in accordance with still another embodiment.

In still another embodiment of a cutter head 17 shown in FIG. 5, an inner surface of the radial hole 19 formed in the annular flange portion 18 is formed as a rounded and convex surface 20. Furthermore, a bush member 21 is mounted on the rounded convex surface 20 for preventing the cord from being damaged and being wound back.

Incidentally, in the case where the head according to the invention is made of lightweight alloy, it is possible to eliminate the bush members 9 and 21. Also, it is possible to modify the cutter head so that a plurality of cutter cords are used.

I claim:

1. A cutter head for a grass trimmer comprising:
   a boss portion adapted to be mounted on a rotary drive shaft of the grass trimmer;
   a disc portion formed coaxially and integrally with said boss portion;
   a cord winding portion around which a cutter cord is to be wound, said cord winding portion extending in an axial direction of said disc portion, said cord winding portion being formed integrally with said disc portion on an opposite side to said boss portion;
   a flange portion formed integrally with an axially outward end of said cord winding portion;
   a hole means formed in said disc portion for guiding a distal end of the cord from said cord winding portion toward said boss portion; and
   an annular flange portion formed integrally with a circumferential portion of said disc portion on the side of said boss portion, and said annular flange portion having a hole through which the distal end of the cord is fed radially outwardly of said disc portion.

2. The cutter head according to claim 1, wherein a hole as said hole means formed in said disc portion for guiding a distal end of the cord from the cord winding portion toward the boss portion is larger in size than the hole through which the distal end of the cord is fed radially outwardly of said disc portion.

3. The cutter head according to claim 1, wherein an inner surface of said hole through which the distal end of the cord is fed radially outwardly of said disc portion is formed in a convexly arcuate configuration.

* * * * *